United States Patent
Klein et al.

(10) Patent No.: US 9,436,562 B1
(45) Date of Patent: Sep. 6, 2016

(54) CIRCUIT NETWORK WITH AN ERROR DETECTION SYSTEM FOR MITIGATION OF ERROR PROPAGATION

(71) Applicant: Xilinx, Inc., San Jose, CA (US)

(72) Inventors: Matthew H. Klein, Redwood City, CA (US); Chen W. Tseng, Longmont, CO (US)

(73) Assignee: XILINX, INC., San Jose, CA (US)

( * ) Notice: Subject to any disclaimer, the term of this patent is extended or adjusted under 35 U.S.C. 154(b) by 241 days.

(21) Appl. No.: 14/171,488

(22) Filed: Feb. 3, 2014

(51) Int. Cl.
  *G06F 11/00* (2006.01)
  *G06F 11/16* (2006.01)
(52) U.S. Cl.
  CPC .................................. *G06F 11/1625* (2013.01)
(58) Field of Classification Search
  CPC ........... G06F 11/1608; G06F 11/1625; G06F 11/1641; G06F 11/165; G06F 11/1654; G06F 11/1666; G06F 11/186; G06F 11/221
  See application file for complete search history.

(56) References Cited

U.S. PATENT DOCUMENTS

| | | | | |
|---|---|---|---|---|
| 4,245,344 A * | 1/1981 | Richter | ............... | G06F 11/1625 714/43 |
| 4,750,181 A * | 6/1988 | McDonald | .......... | G06F 11/0751 714/735 |
| 5,274,647 A * | 12/1993 | Tanaka | ...................... | G06F 5/10 714/48 |
| 5,602,989 A * | 2/1997 | Aria | ..................... | G01R 31/021 714/43 |
| 6,505,310 B1 * | 1/2003 | Brown | .................... | H04L 1/242 714/43 |
| 2015/0106658 A1 * | 4/2015 | Ono | .................... | G06F 11/1608 714/37 |

OTHER PUBLICATIONS

Parity checking, Oct. 15, 2002, Webopedia, http://www.webopedia.com/TERM/P/parity_checking.html, retrieved from the Wayback Machine.*

* cited by examiner

*Primary Examiner* — Marc Duncan
(74) *Attorney, Agent, or Firm* — W. Eric Webostad

(57) ABSTRACT

An apparatus relating generally to an error detection system is disclosed. The apparatus includes a first data bus and a second data bus. A first circuit is coupled for communication via the first data bus. A plurality of storage elements are coupled to the first data bus and the second data bus. A second circuit is coupled for communication via the second data bus. The error detection system is coupled to the first data bus and the second data bus. The error detection system is coupled to compare first data on the first data bus with corresponding second data on the second data bus. The error detection system is configured to generate an error signal responsive to mismatch between the first data and the second data.

18 Claims, 7 Drawing Sheets

US 9,436,562 B1

CIRCUIT NETWORK WITH AN ERROR DETECTION SYSTEM FOR MITIGATION OF ERROR PROPAGATION

TECHNICAL FIELD

The following description relates to integrated circuit devices ("ICs"). More particularly, the following description relates to a circuit network with an error detection system for an IC for mitigation of error propagation.

BACKGROUND

Redundant systems conventionally include multiple instances of the same circuit. Unfortunately, this means that a significant amount of resources are overhead. Accordingly, it would be desirable and useful to provide a more resource efficient system for applications approaching the reliability level of a triple module redundant system.

SUMMARY

An apparatus relates generally to an error detection system. The apparatus includes a first data bus and a second data bus. A first circuit is coupled for communication via the first data bus, and a second circuit is coupled for communication via the second data bus. A plurality of storage elements are coupled to the first data bus and the second data bus. An error detection system is coupled to the first data bus and the second data bus. The error detection system is coupled to compare first data on the first data bus with corresponding second data on the second data bus. The error detection system is configured to generate an error signal responsive to mismatch between the first data and the second data.

An apparatus relates generally to an error detection system. Such an apparatus includes first and second networks. The first network includes a first data bus and a second data bus. A first circuit of the first network is coupled for communication via the first data bus. A first plurality of storage elements of the first network are coupled to the first data bus and the second data bus. A second circuit of the first network is coupled for communication via the second data bus. The error detection system of the first network is coupled to the first data bus and the second data bus. The error detection system is coupled to compare first data on the first data bus with corresponding second data on the second data bus. The error detection system is configured to generate an error signal responsive to mismatch between the first data and the second data. The second network includes a third data bus and a fourth data bus. A third circuit of the second network is coupled for communication via the third data bus. A second plurality of storage elements of the second network is coupled to the third data bus and the fourth data bus. A fourth circuit of the second network is coupled for communication via the fourth data bus. The apparatus further includes a multiplexer coupled to receive first output data from the second circuit and second output data from the fourth circuit as respective sets of data inputs, and further coupled to receive the error signal as a control select signal to select either the first output data or the second output data as a multiplexer output.

A method relates generally to error detection. In such a method, first data is bused from a first circuit for communication via a first data bus to a plurality of storage elements and an error detection system coupled to the first data bus. Second data is bused from the plurality of storage elements for communication via a second data bus to the error detection system and a second circuit. A first parity of the first data is determined by the error detection system. A second parity of the second data is determined by the error detection system. The first parity and the second parity are compared by the error detection system. An error signal is asserted responsive to a mismatch between the first parity and the second parity.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
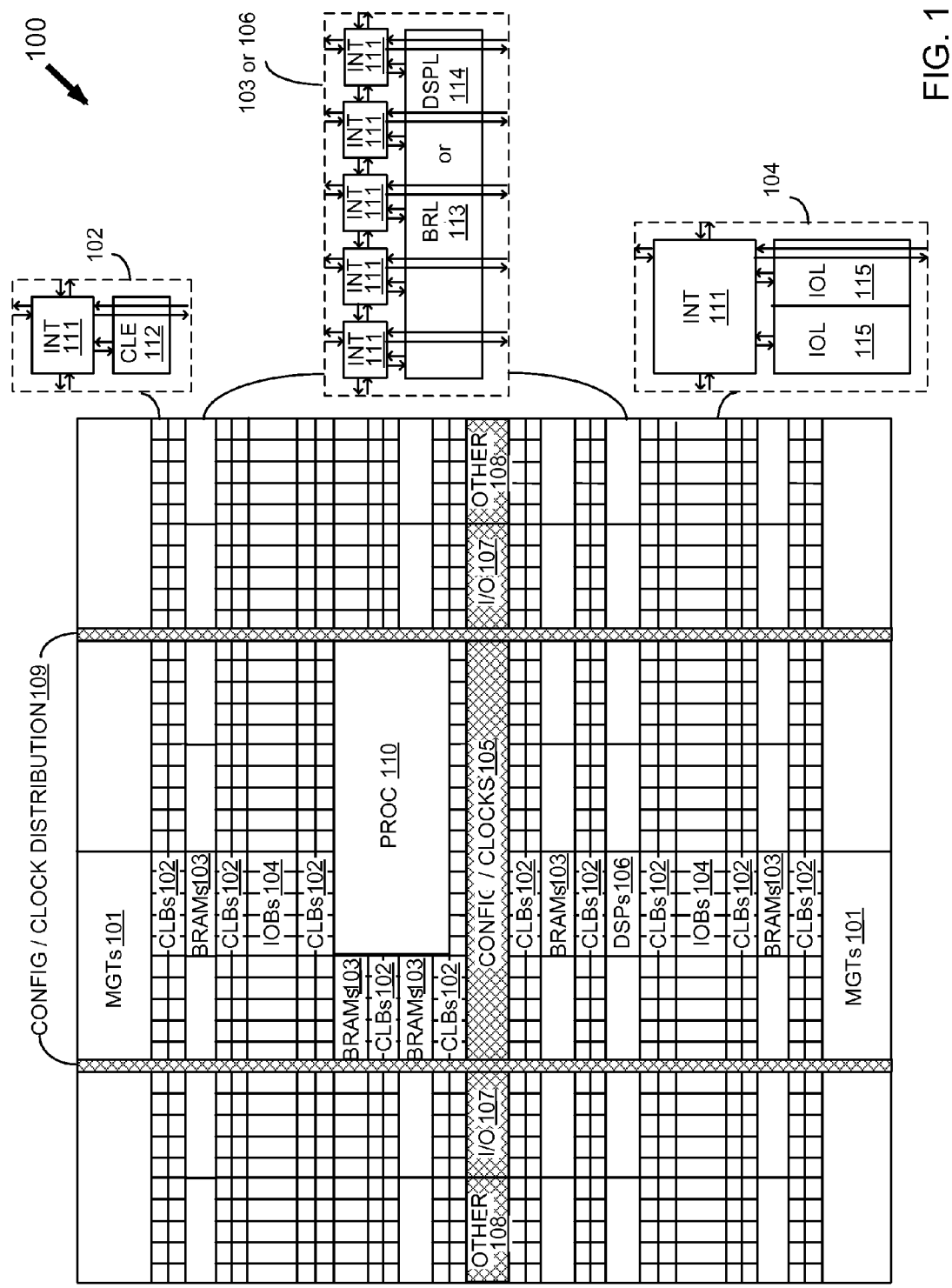
FIG. 1 is a simplified block diagram depicting an exemplary columnar Field Programmable Gate Array ("FPGA") architecture.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Redundant systems conventionally include multiple instances of the same circuit. Accordingly, if one of such circuits has its data corrupted, data on another of such circuits may be used. For instantiation of such redundancy in programmable resources of an IC, namely "programmable fabric", conventionally double or triple module redundancy may be automatically instantiated by programmable fabric programming generated by software tools therefor. Unfortunately, this means that a significant amount of resources are overhead.

With the above general understanding borne in mind, various configurations for an error detection system of a circuit network are generally described below. Such error detection system may involve lower circuit overhead than a triple module redundant system while providing a degree of mitigation against downstream error propagation, which may be associated with a changed data state of an associated register or routing component. In particular, an error may be generated by a single-event upset ("SEU"), as known. A circuit network with an error detection system may be a more efficient implementation, in cost associated with resources or power consumption, than protection provided with automated triple module redundancy ("TMR"). Additionally, data or other content stored in registers, such as delay-type clocked flops for example, may be transferred in and out of such registers at a high clock rate. By high clock rate, it is generally meant in excess of approximately 200 MHz. As described below in additional detail, input data to and output data from such registers may be processed in parallel with operation of such registers in real-time for dynamic content error detection and mitigation.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 2:
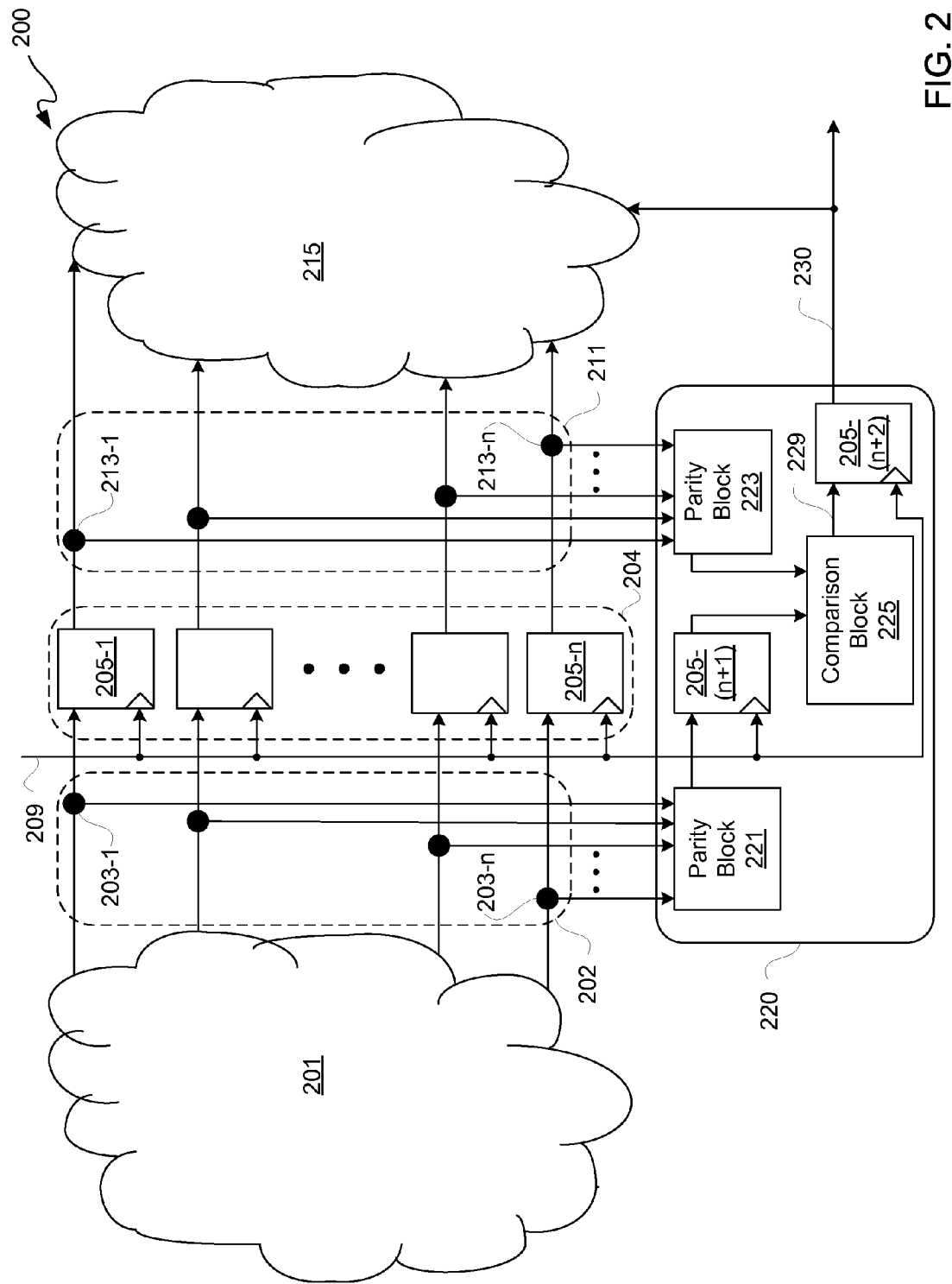
FIG. 2 is a block diagram depicting an exemplary circuit network.

FIG. 2 is a block diagram depicting an exemplary circuit network 200. Circuit network 200 may be used to protect circuitry associated with registers and associated routing components. Along those lines, circuit network 200 may be used for mitigation of error propagation in downstream circuitry.

Circuit network 200 includes a circuit 201, illustratively depicted generally as a "cloud," coupled to another circuit 215, likewise illustratively depicted generally as a "cloud". Such general depictions of clouds are to indicate that any data processing circuit of sufficient complexity may be used.

Circuit 201 has or is directly coupled to data bus 202. A plurality of storage elements, such as a register stage 204, may be coupled to an input-side of a data bus 202 to receive data from such bus. Circuit 215 has or is directly coupled another data bus 211. Data bus 211 may be coupled to such plurality of storage elements, namely such as register stage 204, on an output-side of such stage, and circuit 215 may be coupled via data bus 211 to receive data from such output-side of register stage 204. Even though a register stage 204 is illustratively depicted for a plurality of storage elements in this example, in other implementations such plurality of storage elements may include arrays of memory cells.

An error detection system 220 may be coupled to data bus 202 and to data bus 211. Even though busing is generally described, it should be understood that such data may be for control signaling, addressing, uncorrelated data, and/or correlated data for processing through register state 204, as well as for processing by error detection system 220, as described below in additional detail.

Error detection system 220 may be coupled to compare "first" data on data bus 202 with corresponding "second" data on data bus 211. Error detection system 220 may be configured to generate an error signal 229 responsive to a mismatch between corresponding first and second data.

For purposes of clarity by way of example and not limitation, it shall be assumed that: data bus 202 is an output data bus of circuit 201 and an input bus of register stage 204, and data bus 211 is an output bus of register stage 204 and an input data bus of circuit 215. Routing nodes 203-1 through 203-n ("routing nodes 203"), which may be part of data bus 202, may provide first data to both register stage 204 and error detection system 220. Routing nodes 213-1 through 213-n ("routing nodes 213"), which may be part of data bus 211, may provide second data to both error detection system 220 and circuit 215. For an example for FPGA implementation, routing nodes 203 and 213 may be programmable interconnects, such as PIPs of programmable fabric; however, static or programmable routing nodes may be used in other types of ICs. Error detection system 220 may effectively be coupled in parallel with register stage 204 for clocked passage of first data on data bus 202 to second data on data bus 211 through registers 205-1 through 205-n ("registers 205") of register stage 204. Likewise, for an FPGA implementation, registers 205 may be programmable resources of programmable fabric.

Routing nodes 203 may be coupled nearer to circuit 201 than corresponding registers 204. Having routing nodes 203 coupled near to circuit 201 may provide an input-end for maximum routing pipeline coverage by error detection system 220 as associated with first data on data bus 202. In other words, such first data may be captured by error detection system 220 at least approximately contemporaneously with such first data leaving circuit 201. Along those lines, routing nodes 213 may be coupled nearer to circuit 215 than corresponding registers 204. Having routing nodes 213 coupled near to circuit 215 may provide an output end for maximum routing pipeline coverage by error detection system 220 as associated with second data on data bus 211. In other words, such second data may be captured by error detection system 220 at least approximately contemporaneously with such second data entering circuit 205. For an FPGA implementation, routing nodes 203 may be programmable interconnects of programmable fabric that are nearest to circuit 201 for maximum routing pipeline coverage by error detection system 220 on an input-side of register stage 204, and routing nodes 213 may be programmable interconnects of programmable fabric that are nearest to circuit 215 for maximum routing pipeline coverage by error detection system 220 on an output-sider of register stage 204. Thus, earliest possible fanout routing points may be selected in an instantiation of error detection system 220, in programmable fabric or dedicated hardware, for routing first data signals to a parity check block 221 of such error detection system 220, and latest possible fanin routing points may be selected in such an instantiation of error detection system 220 for routing second data signals to a parity check block 223 of such error detection system 220. With respect to the latter, latest possible fanin routing points, or fanout routing points with respect to an output-side of register stage 204, may be before fanin to circuit 215, namely before circuit 215 receives such second data. Having a maximum routing pipeline coverage may ensure that such data passed through register stage 204 is covered by error detection of error detection system 220.

Error detection system 220 includes parity blocks 221 and 223, a storage element such as register 205($n-1$) for example, a comparison block 225, and optionally a storage element such as a register 205($n+2$) for example. For purposes of clarity by way of example and not limitation blocks 221, 223, and 225 may each be implemented with XOR logic; however, in other implementations this or other types of logic may be used. Parity block 221 may be coupled to data bus 202 via routing nodes 203 thereof for respectively providing first data via corresponding first data signals for input to parity block 221. A parity result of a parity check on a set of first data by parity block 221 may be output to register 205($n-1$).

Generally, a storage element, such as register 205($n-1$), may be a same type as those of a plurality of storage elements coupling data buses 202 and 211, which in this example is registers 205. Register 205($n-1$) coupled to parity block 221 to receive parity result outputs therefrom may be clocked by a same clock signal 209 used to registers 205. Moreover, optional register 205($n+2$) may be clocked with clock signal 209. Generally, clocked resources of error detection system 220 may be clocked with the same or a different clock than register stage 204. However, to avoid cross-clock domain issues, such as metastability, same clock domains or derivatives of a same clock source may be used. Furthermore, error detection system 220 may be clocked at a highest frequency of a protected circuit, namely downstream circuit 215 in this example.

Responsive to an edge, rising or falling, of a clock cycle of clock signal 209, first data stored in registers 205 may be clocked out onto data bus 211 as second data. Likewise, a parity value or result output from parity block 221 and stored in register 205(*n*–1) may be clocked out for such second data on such edge of clock cycle of clock signal 209. Parity block 223 may be coupled to data bus 211 via routing nodes 213 thereof for respectively providing such second data, which was first data on an immediately prior clock cycle of clock signal 209, via corresponding second data signals for input to parity block 223. A parity result of a parity check on a set of second data by parity block 223 may be output to comparison block 225. Likewise, a parity result stored in register 205(*n*–1) for first data of such immediately prior clock cycle, may be output to comparison block 225. Comparison block 225 coupled to register 205(*n*–1) and parity block 223 to respectively receive parity results therefrom may be configured to compare outputs of register 205(*n*–1) and parity block 223 to provide an error signal 229. Error signal 229 may be asserted, for example transitioned to either a logic 0 or 1 state, or maintained in an asserted state responsive to an error being detected, namely responsive to outputs from register 205(*n*–1) and parity block 223 not matching. Error signal 229 may be de-asserted, for example transitioned to either a logic 1 or 0 state, or maintained in a non-asserted state, responsive to no error being detected, namely responsive to outputs from register 205(*n*–1) and parity block 223 matching.

For routing nodes 203, routing nodes 213, and/or registers 205 instantiated using programmable resources of programmable fabric, such programmable resources may include configuration memory cells of FPGA 100 of FIG. 1. Even though such configuration memory cells may be somewhat hardened to withstand most cosmic or other radiation, one or more configuration memory cells may still be susceptible to a single-event upset ("SEU"). Thus first and/or second data may be corrupted due to one or more SEUs. However, for purposes of clarity by way of example and not limitation, a single SEU at a time is assumed to disturb only a single bit.

In addition to first and second data passed into and out of one or more of registers 205 of register stage 204 being subject to a SEU, register 205(*n*–1) and/or other resources of error detection system 220 may be vulnerable to an SEU. Accordingly, error signal 229 may be a false flag in such an instance, a false flag is predominantly more likely to be a false positive than a false negative. However, a false positive for error signal 229 is reasonably acceptable as it may still be used to protect downstream circuit 215.

Register 205(*n*+2) may be coupled to comparison block 225 to receive error signal 229. On a next clock cycle of clock signal 209, state of error signal 229 stored in register 205(*n*+2) may be output as error signal 230. Optionally, error signal 230 may be provided to circuit 215 to protect circuit resources thereof. Register 205(*n*+2) may be used to provide more stability in providing an error signal.

If circuits 201 and 215 are sufficiently large circuits, then coupling error detection system 220 to buses 202 and 211 may consume significantly fewer resources than a triple module redundancy or a dual module redundancy implementation of those circuits 201 and 215. However, with respect to a dual module redundancy implementation, error detection system 220 may still be used, as described in additional detail for example with reference to FIG. 3.

Figure 3:
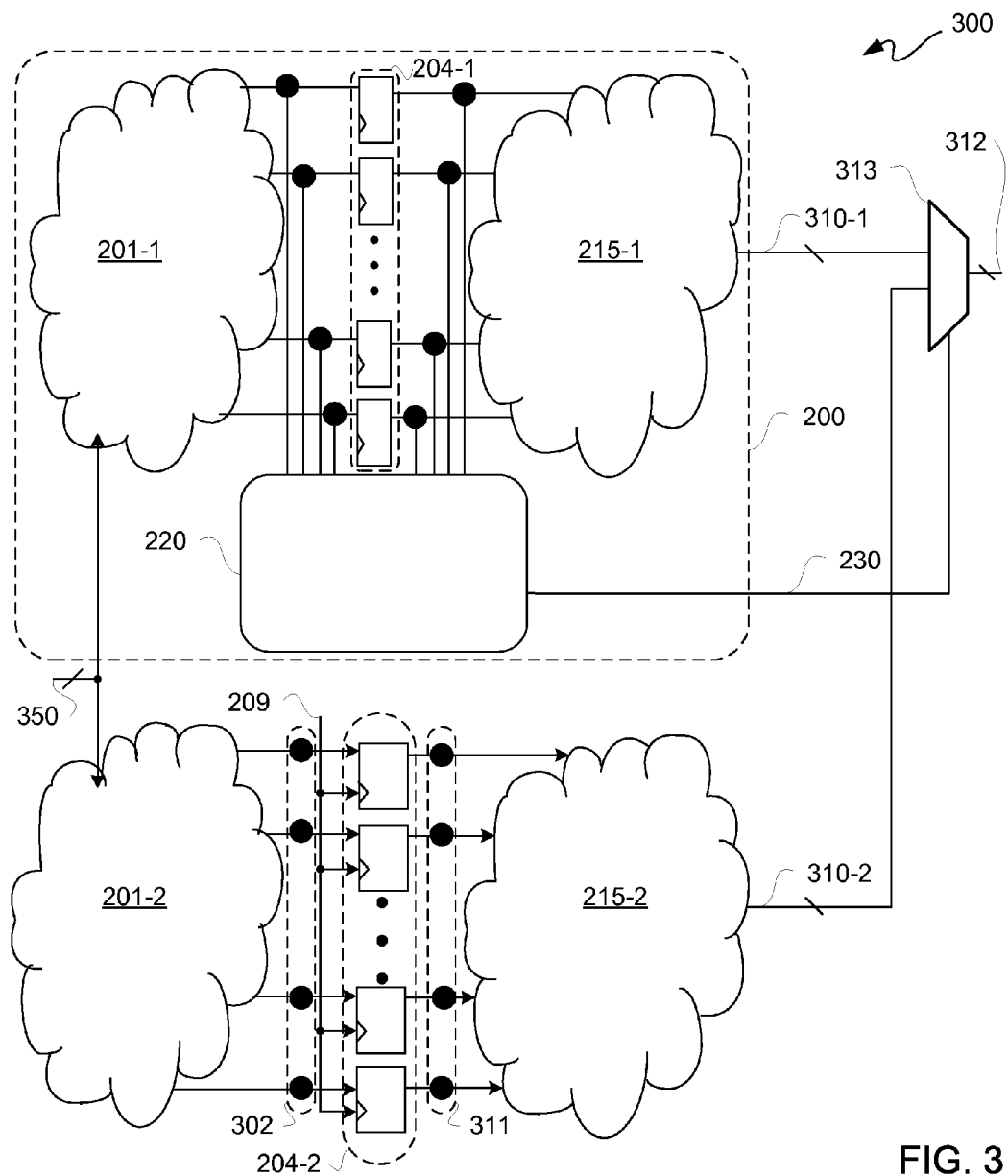
FIG. 3 is a block diagram depicting another exemplary circuit network.

FIG. 3 is a block diagram depicting an exemplary circuit network 300. Even though circuit network 300 is described generally in terms of an FPGA implementation, circuit network 300 may be used in an ASIC or ASSP or other IC implementation.

Circuit network 300 includes circuit network 200 with error detection system 220 respectively coupled to circuits 201-1 and 215-1, which correspond to circuits 201 and 215 in FIG. 2, and circuits 201-1 and 215-1 coupled to one another through register stage 204-1 corresponding to register stage 204 in FIG. 2. Additionally, circuit network 300 includes circuits 201-2 and 215-2 coupled to one another via register stage 204-2. Circuits 201-1 and 201-2 may be copies of one another, and circuits 215-1 and 215-2 may be copies of one another. Register stage 204-2 may be a copy of register stage 204-1. However, data bus 302 coupling circuit 201-2 to register stage 204-2 need not be coupled to an error detection system 220. Likewise, data bus 311 coupling register stage 204-2 to circuit 215-2 need not be coupled to an error detection system 220. Data buses 302 and 311 may include programmable interconnects 203 and 213, though not configured for coupling to an error detection system.

Error signal 230 sent from error detection system 220 of circuit network 200 may be provided as a control select signal to multiplexer 313. Multiplexer 313 may be coupled to receive output data 310-1 from circuit 215-1 of circuit network 200 as one data bus input, and multiplexer 313 may further be coupled to receive output data 310-2 from circuit 215-2 as another data bus input. For error signal 230 indicating there is no data error in output data 310-1, multiplexer 313 may select such output data 310-1 for providing output data on output data bus 312 of circuit network 300. For error signal 230 indicating there is a data error in output data 310-1, multiplexer 313 may select such output data 310-2 for providing output data on output data bus 312 of circuit network 300. Register 205-(*n*+2) may represent one or more registers coupled in series to correspond to pipelined data propagation delay through circuit 215-1, such that corresponding sets of output data 310-1 and 310-2 are generally gated at within a same time interval by multiplexer 313.

Circuits 201-1 and 201-2 may each receive same input data 350 for processing to respectively provide output data 310-1 and 310-2 via circuits 215-1 and 215-2, as previously described. If there is no data error in output data 310-1, then such data may be selected by multiplexer 313 for output. If, however, there is a data error as indicated by state of error signal 230 in output data 310-1 due to an error in input data to circuit 215-1, then output data 310-2 may be selected by multiplexer 313 for output. For this dual module redundancy configuration, instead of tossing out a data packet where there is a data mismatch, a detected parity mismatch may be used to select data for output. In this configuration, only one copy of error detection logic may be needed, since if an error happened to occur in redundant circuit network, 200, output data from a base circuit network may be passed downstream. This configuration may be used in instances where likelihood of an error in corresponding output data buses input to multiplexer 313 is sufficiently low, and risk of such data error causing substantial harm downstream in the event of such an unlikely even is sufficiently low, so as not to warrant additional overhead to protect against such minimal risk.

Figure 4:
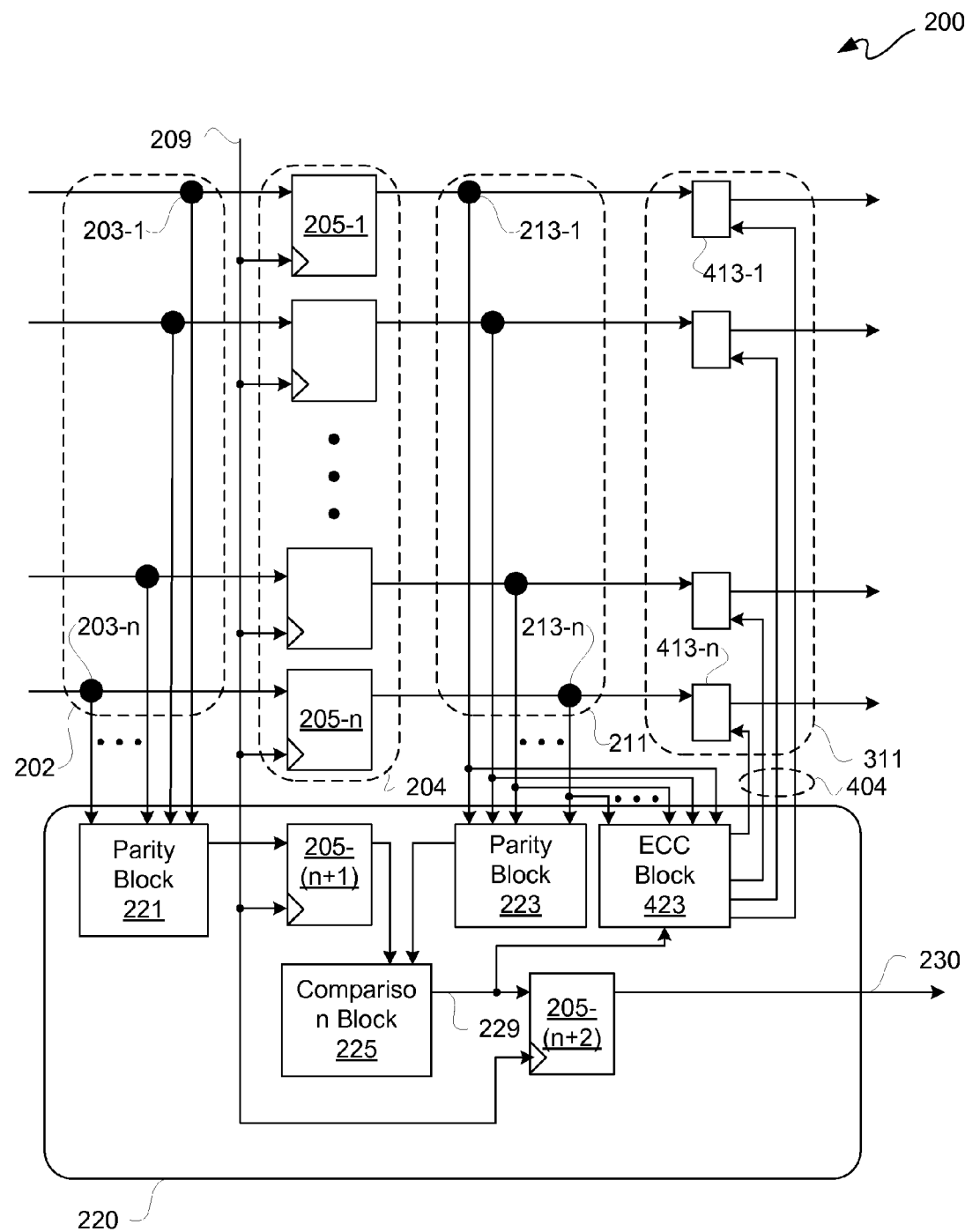
FIG. 4 is a block diagram depicting yet another exemplary circuit network.

FIG. 4 is a block diagram depicting another exemplary circuit network 200. Circuit network 200 of FIG. 4 is circuit network 200 of FIG. 2 with the addition of error correction, and accordingly generally only the differences are described below in additional detail for purposes of clarity.

Error detection system 220 may include an error-correcting code ("ECC") block 423. For purposes of clarity by way of example and not limitation, it shall be assumed that ECC block 423 is for correction of single bit errors only. However, in other configurations, such as where syndrome bits are used for example, more than one bit in error may be corrected.

ECC block 423 is coupled to routing nodes 213, as is parity block 223. Additionally, routing nodes 213 may be respectively coupled to selection circuits 413-1 through 413-*n* ("selection circuits 413"). ECC block 423 may be coupled to receive output of comparison block 225, namely error signal 229 for example. If output of comparison block 225 indicates that no mismatch is detected, then none of ECC block 423 data state correction outputs 404 is asserted. If, however, output of comparison block 225 indicates to ECC block 423 that a mismatch is detected, then a data state correction output of data state correction outputs 404 for such erroneous bit is asserted. ECC block 423 may be configured to, responsive from assertion of an error signal, determine from input data from routing nodes 213 which data lane has an erroneous bit, and then to assert a corresponding data state correction signal of data state correction outputs 404 to cause a current data state on such data lane to be flipped, either from a logic 1 to a logic 0 or vice versa.

Figure 5:
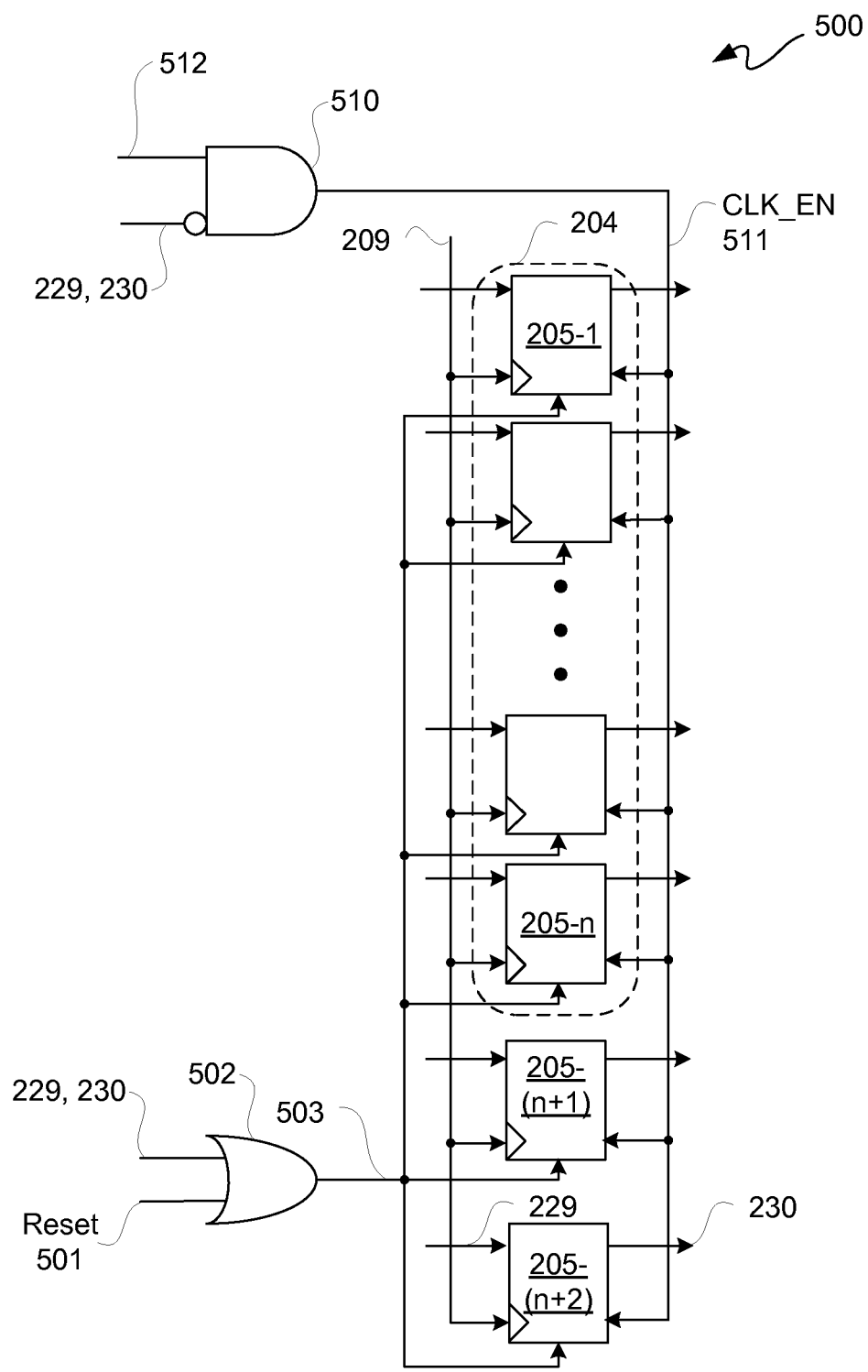
FIG. 5 is a schematic diagram depicting an exemplary set/reset and clock activation circuit.

FIG. 5 is a schematic diagram depicting an exemplary set/reset and clock activation circuit 500 for registers 205 of register stage 204, as well as registers 205-(*n*+1) and 205-(*n*+2), herein after "registers 205". Assuming an error signal 229 or 230 indicates an error state, then after such indication, registers 205 may be reset. Likewise, registers 205 may be clock activated or deactivated for synchronizing operation or stopping operation. In this example, specific logic gates and logic states are described; however, it shall be appreciated from the following description that these or other logic gates and/or states may be used.

Error signal 229 or 230 may be input to a logic gate, such as OR gate 502 in this example, along with a reset control signal 501. Reset output 503 from OR gate 502 may be provided to each reset port of registers 205. Thus, after an error is detected, error signal 229 or 230 may be asserted by being transitioned to a logic 1, and accordingly reset output 503 of OR gate 502 may cause each of registers 205 to be reset responsive to detection of a mismatch in input and output data sets. Likewise, if reset control signal 501 is asserted, each of registers 205 may be reset by assertion of reset output 503. Along those lines, error detection system 220 may be held in a reset state by assertion of reset control signal 501.

Error signal 229 or 230 may be input to a logic gate, such as an inverted port of AND gate 510 in this example, and another input to such logic gate may be a clock control signal 512. In this example, clock control signal 512 is provided to a non-inverted port of AND gate 510. Output of AND gate 510 may be a clock enable signal 511. Clock enable signal 511 may be provided to each clock enable port of registers 205. Thus, to activate error detection for error processing, error signal 229 or 230 may be deasserted by being at a logic 0, and clock control signal 512 may be at a logic 1. Accordingly, clock enable signal 511 may be asserted to cause each of registers 205 to be activated for being clocked, such as by clock signal 209. Likewise, if either clock control signal 512 or error signal 229 or 230 is asserted, each of registers 205 may be deactivated for being clocked.

Figure 6:
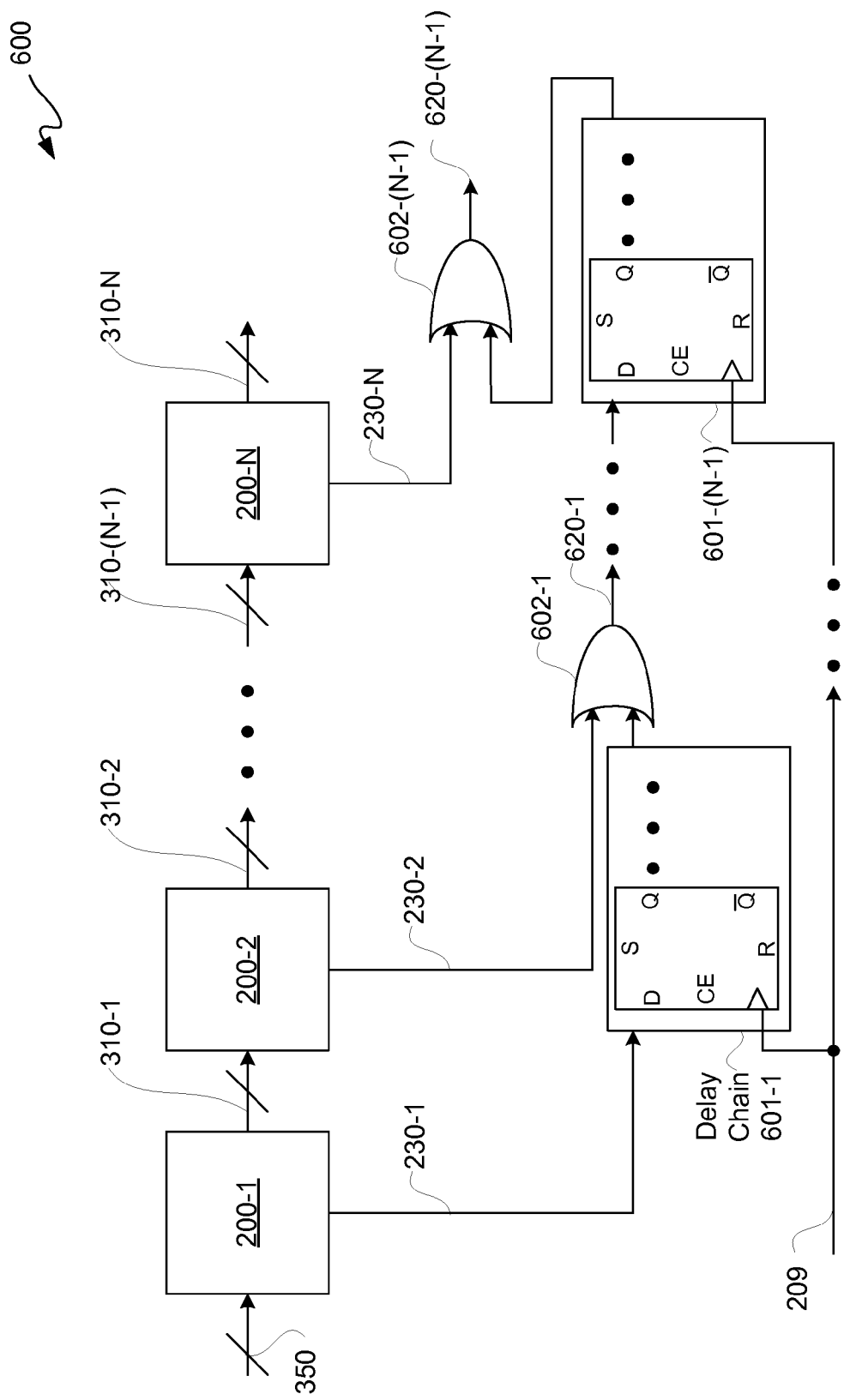
FIG. 6 is a block diagram depicting an exemplary multi-stage network.

FIG. 6 is a block diagram depicting an exemplary multi-stage network 600. Multi-stage network 600 includes circuit networks 200-1 through 200-N, for an integer N that may or may not be the same integer as n as described above. Circuit networks 200-1 through 200-N are respective instances of circuit networks 200, as described elsewhere herein. Circuit networks 200-1 through 200-N are coupled in series, where circuit network 200-1 received input data 350 and provides output data 310-1, as well as a corresponding error signal 230-1 therefor. Circuit network 200-2 is coupled to receive output data 310-1 as input data to provide output data 310-2, as well as a corresponding error signal 230-1 therefor. Such series may continue to a circuit network 200-N coupled to receive output data 310-(N−1) as input data to provide output data 310-N, as well as a corresponding error signal 230-N therefor. While N in this example is three or more, N may be as few as two. Furthermore, in this example, specific logic gates and logic states are described; however, it shall be appreciated from the following description that these or other logic devices and/or states may be used.

Error signal 230-1 may be provided as an input to a clocked delay chain 601-1 for at least approximately matching delay in pipelining of data in circuit network 200-2, and thus output of delay chain 601-1 may be a delayed version of error signal 230-1. Output of delay chain 601-1 may be provided as an input to OR gate 602-1 along with error signal 230-2. Output 620-1 of OR gate 602-1 may be provided as an input to a next clocked delay chain, and so on. Output of a last clocked delay chain 601-(N−1) may be provided as an input to OR gate 602-(N−1) along with error signal 230-N. Output 620-(N−1) of OR gate 602-(N−1) may be provided with corresponding output data 310-N of circuit network 200-N to indicate whether any error arose in a stage of multi-stage network 600. Along those lines, error flags are not pipelined. If outputs of registers 205 of a register stage 204 go through additional stages of synchronous elements, additional registers, or other storage elements, may be inserted to account for delay of such additional stages and allow maximum of valid data to be propagate through such stages.

Figure 7:
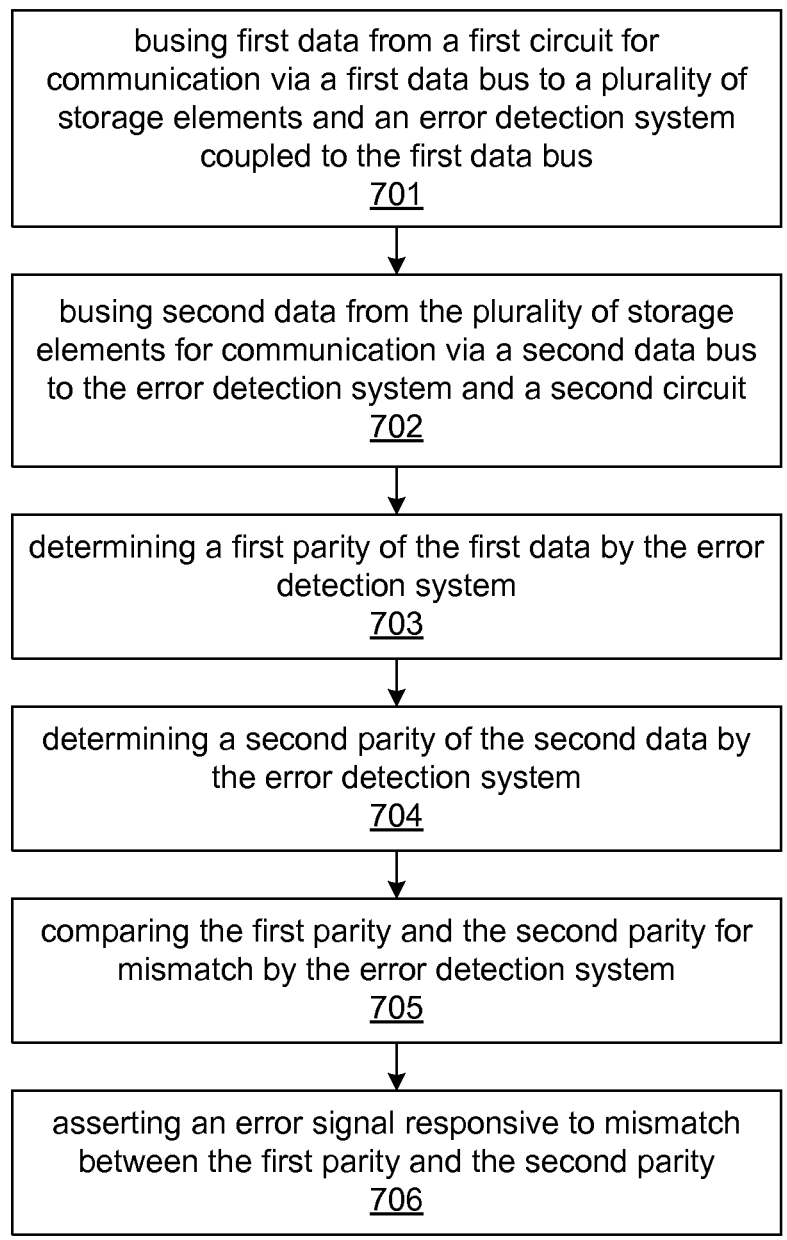
FIG. 7 is a flow diagram depicting an exemplary error detection flow in accordance with the circuit network of FIG. 2.

FIG. 7 is a flow diagram depicting an exemplary error detection flow 700 in accordance with circuit network 200 of FIG. 2. Error detection flow 700 is further described with simultaneous reference to FIGS. 2 and 7.

At 701, first data is bused from a first circuit 201 for communication via a data bus 202 to a plurality of storage elements, such as registers 205 of register stage 204, and an error detection system 220 coupled to data bus 202. At 702, second data is bused from such plurality of storage elements for communication via a data bus 211 to error detection system 220 and a second circuit 215. At 703, a first parity of such first data is determined by error detection system 220. At 704, a second parity of such second data is determined by error detection system 220. At 705 such first parity and second parity are compared for mismatch by error detection system 220. At 706, an error signal 229 is asserted responsive to mismatch between such first and second parity.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:
1. An apparatus, comprising:
a first data bus and a second data bus;
a first circuit coupled for communication via the first data bus;
a second circuit coupled for communication via the second data bus;
a plurality of storage elements coupled to the first data bus and the second data bus;
an error detection system coupled to the first data bus and the second data bus;

the error detection system configured to compare first data on the first data bus with corresponding second data on the second data bus;

the error detection system configured to generate an error signal responsive to mismatch between the first data and the second data;

first routing nodes of the first data bus to provide the first data to both the plurality of storage elements and the error detection system;

second routing nodes of the second data bus to provide the second data to both the error detection system and the second circuit;

the first routing nodes coupled nearer to the first circuit for a first routing pipeline coverage end of the error detection system as associated with the first data on the first data bus; and the second routing nodes coupled nearer to the second circuit for a second routing pipeline coverage end of the error detection system as associated with the second data on the second data bus.

2. The apparatus according to claim 1, wherein:
the first data bus is coupled to a first output bus of the first circuit and to a first input bus of the plurality of storage elements; and
the second data bus is coupled to a second output bus of the plurality of storage elements and to a second input bus of the second circuit.

3. The apparatus according to claim 1, wherein the plurality of storage elements are coupled in parallel for clocked passage of the first data on the first data bus to the second data on the second data bus through the plurality of storage elements.

4. The apparatus according to claim 1, wherein:
the first routing nodes are coupled nearer to the first circuit than the plurality of storage elements; and
the second routing nodes are coupled nearer to the second circuit than the plurality of storage elements.

5. The apparatus according to claim 1, wherein:
the first routing nodes are coupled nearer to the first circuit for a first maximum routing pipeline coverage end for the first routing pipeline coverage end of the error detection system as associated with the first data on the first data bus; and
the second routing nodes are coupled nearer to the second circuit for a second maximum routing pipeline coverage end for the second routing pipeline coverage end of the error detection system as associated with the second data on the second data bus.

6. The apparatus according to claim 5, wherein:
the first routing nodes are coupled for earliest of the first data on the first data bus; and
the second routing nodes are coupled for latest of the second data on the second data bus.

7. The apparatus according to claim 5, wherein:
the plurality of storage elements are registers from programmable fabric; and
the first routing nodes and the second routing nodes are programmable interconnects of the programmable fabric.

8. The apparatus according to claim 1, wherein the error detection system comprises:
a first parity block coupled to the first data bus;
a second parity block coupled to the second data bus;
a storage element, which is a same type as those of the plurality of storage elements, coupled to the first parity block; and a comparison block coupled to compare outputs of the storage element and the second parity block to provide an error signal.

9. The apparatus according to claim 8, wherein the error detection system further comprises:
an error correction block coupled to the second data bus and to receive the error signal; and
a plurality of selection blocks respectively coupled to data lanes of the second data bus and coupled to the error correction block.

10. An apparatus, comprising:
a first network including:
a first data bus and a second data bus;
a first circuit coupled for communication via the first data bus;
a first plurality of storage elements coupled to the first data bus and the second data bus;
a second circuit coupled for communication via the second data bus; and
an error detection system coupled to the first data bus and the second data bus;
the error detection system configured to compare first data on the first data bus with corresponding second data on the second data bus; and
the error detection system configured to generate an error signal responsive to mismatch between the first data and the second data;
a second network including:
a third data bus and a fourth data bus;
a third circuit coupled for communication via the third data bus;
a second plurality of storage elements coupled to the third data bus and the fourth data bus; and
a fourth circuit coupled for communication via the fourth data bus; and
a multiplexer coupled to receive first output data from the second circuit and second output data from the fourth circuit as respective sets of data inputs, and further coupled to receive the error signal as a control select signal to select either the first output data or the second output data as a multiplexer output.

11. The apparatus according to claim 10, wherein the first circuit and the third circuit are commonly coupled to receive input data.

12. The apparatus according to claim 10, wherein:
the error detection system is a first error detection system;
the error signal is a first error signal; and
the second network further includes:
a second error detection system coupled to the third data bus and the fourth data bus;
the second error detection system configured to compare third data on the third data bus with corresponding fourth data on the fourth data bus; and
the second error detection system configured to generate a second error signal responsive to mismatch between the third data and the fourth data.

13. The apparatus according to claim 12, further comprising:
a delay chain coupled to receive the first error signal to provide a delayed version of the first error signal; and
a logic device coupled to receive the second error signal and the delayed version of the first error signal.

14. The apparatus according to claim 12, wherein:
first routing nodes are part of the first data bus to provide the first data to both the first plurality of storage elements and the first error detection system;

second routing nodes are part of the second data bus to provide the second data to both the first error detection system and the second circuit;

third routing nodes are part of the third data bus to provide the third data to both the second plurality of storage elements and the second error detection system; and fourth routing nodes are part of the fourth data bus to provide the fourth data to both the second error detection system and the fourth circuit.

15. The apparatus according to claim 14, wherein:

the first routing nodes are coupled nearer to the first circuit than the first plurality of storage elements;

the second routing nodes are coupled nearer to the second circuit than the first plurality of storage elements;

the third routing nodes are coupled nearer to the third circuit than the second plurality of storage elements; and the fourth routing nodes are coupled nearer to the fourth circuit than the second plurality of storage elements.

16. The apparatus according to claim 15, wherein:

the first plurality of storage elements and the second plurality of storage elements are registers from programmable fabric; and the first routing nodes, the second routing nodes, the third routing nodes, and the fourth routing nodes are programmable interconnects of the programmable fabric.

17. A method, comprising:

busing first data from a first circuit for communication via a first data bus to a plurality of storage elements and an error detection system coupled to the first data bus;

busing second data from the plurality of storage elements for communication via a second data bus to the error detection system and a second circuit;

determining a first parity of the first data by the error detection system;

determining a second parity of the second data by the error detection system;

comparing the first parity and the second parity by the error detection system;

asserting an error signal responsive to a mismatch between the first parity and the second parity;

providing the first data to both the plurality of storage elements and the error detection system via first routing nodes of the first data bus;

providing the second data to both the error detection system and the second circuit via second routing nodes of the second data bus;

the first routing nodes coupled nearer to the first circuit for a first routing pipeline coverage end of the error detection system as associated with the first data on the first data bus; and the second routing nodes coupled nearer to the second circuit for a second routing pipeline coverage end of the error detection system as associated with the second data on the second data bus.

18. The apparatus according to claim 17, wherein:

the first routing nodes are coupled nearer to the first circuit for a first maximum routing pipeline coverage end for the first routing pipeline coverage end of the error detection system as associated with the first data on the first data bus; and the second routing nodes are coupled nearer to the second circuit for a second maximum routing pipeline coverage end for the second routing pipeline coverage end of the error detection system as associated with the second data on the second data bus.

* * * * *